US008630893B2

(12) United States Patent
Stibel et al.

(10) Patent No.: US 8,630,893 B2
(45) Date of Patent: *Jan. 14, 2014

(54) AUTOMATED OMNIPRESENT REAL-TIME CREDIBILITY MANAGEMENT SYSTEM AND METHODS

(71) Applicant: Credibility Corp., Malibu, CA (US)

(72) Inventors: Jeffrey M. Stibel, Malibu, CA (US); Aaron B. Stibel, Malibu, CA (US)

(73) Assignee: Credibility Corp., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/744,035

(22) Filed: Jan. 17, 2013

(65) Prior Publication Data

US 2013/0132151 A1 May 23, 2013

Related U.S. Application Data

(63) Continuation of application No. 13/549,765, filed on Jul. 16, 2012, now Pat. No. 8,392,230.

(60) Provisional application No. 61/508,256, filed on Jul. 15, 2011.

(51) Int. Cl.
*G06Q 10/00* (2012.01)

(52) U.S. Cl.
USPC ....... 705/7.32; 705/7.31; 705/7.11; 705/7.29; 705/38

(58) Field of Classification Search
None
See application file for complete search history.

(56) References Cited

U.S. PATENT DOCUMENTS

| 7,720,835 | B2 * | 5/2010 | Ward et al. ............. 707/710 |
| 7,886,000 | B1 | 2/2011 | Polis et al. |
| 8,266,158 | B2 * | 9/2012 | Glass et al. ............. 707/752 |
| 2008/0109491 | A1 * | 5/2008 | Gupta ................... 707/104.1 |
| 2008/0133488 | A1 | 6/2008 | Bandaru et al. |

(Continued)

OTHER PUBLICATIONS

Ghose, Anindya, Panagiotis G. Ipeirotis, and Arun Sundararajan. "Opinion Mining using econometrics: A case study on reputation systems."Annual Meeting-Association for Computational Linguistics. vol. 45. No. 1. 2007.*

(Continued)

*Primary Examiner* — Jonathan G Sterrett
*Assistant Examiner* — Tzu-Hsiang Lan
(74) *Attorney, Agent, or Firm* — Los Angeles Patent Group; Arman Katiraei (57) ABSTRACT

Some embodiments provide a credibility management system that aggregates user posts from several social media sites contemporaneously with the posts being published to those sites. The system parses each of the aggregated posts to identify an entity that is targeted in each of the posts and presents the posts to the targeted entities in a real-time manner. The credibility management system computes a score to determine the impact that a user post would have on the credibility of a targeted entity. By presenting the computed scores and aggregated posts to the targeted entities, the credibility management system notifies the targeted entities about what is being said about them across social media, identifies the impact of those posts, and provides a platform whereby the targeted entities can reply in order to mitigate or improve the impact that the posts would have on credibility.

15 Claims, 7 Drawing Sheets

(56) References Cited

U.S. PATENT DOCUMENTS

| | | | |
|---|---|---|---|
| 2009/0204471 A1* | 8/2009 | Elenbaas et al. | 705/9 |
| 2009/0234727 A1* | 9/2009 | Petty | 705/14 |
| 2009/0328209 A1 | 12/2009 | Nachenberg | |
| 2010/0070485 A1 | 3/2010 | Parsons et al. | |
| 2010/0106557 A1 | 4/2010 | Buss | |
| 2010/0325107 A1 | 12/2010 | Kenton et al. | |
| 2011/0145219 A1 | 6/2011 | Cierniak et al. | |
| 2011/0288897 A1* | 11/2011 | Erhart et al. | 705/7.13 |
| 2012/0047219 A1 | 2/2012 | Feng et al. | |
| 2012/0226627 A1 | 9/2012 | Yang | |
| 2012/0246085 A1 | 9/2012 | Depalma | |

OTHER PUBLICATIONS

Ross A. Malaga, "Web-based reputation management system; problems and suggested solutions," Kluwer Academic Publisher, Electronic Commerce research, 1:403-417 (2001).

Liu, Ling "Systematic Measurement of Centralized Online Reputation Systems," Durham theses, Durham University, Apr. 2011, Available at Durham E-Theses online: http://etheses.dur.ac.uk/881/.

Wang, Shangguang et al., "Evaluating Feedback Rating for Measuring Reputation of Web Services" 2011 IEEE international conference on Service computing May 11, 2011.

Weerkamp et al., "Credibility Improves Topical Blog Post Retrieval" Proceedings of ACL-08: HLT, Jun. 2008, pp. 923-931.

* cited by examiner

AUTOMATED OMNIPRESENT REAL-TIME CREDIBILITY MANAGEMENT SYSTEM AND METHODS

CLAIM OF BENEFIT TO RELATED APPLICATIONS

This application is a continuation of the U.S. nonprovisional patent application Ser. No. 13/549,765 entitled "Automated Omnipresent Real-Time Credibility Management System and Methods", filed on Jul. 16, 2012 which claims the benefit of U.S. provisional application 61/508,256 entitled "Automated Omnipresent Real-time Credibility Management System and Methods", filed Jul. 15, 2011. The contents of application Ser. Nos. 13/549,765 and 61/508,256 are hereby incorporated by reference.

TECHNICAL FIELD

The present invention pertains to a system, methods, and software products for managing entity credibility.

BACKGROUND

Credibility is a factor that greatly affects the success of a business and how entities are perceived by others. Credibility is derived from many different sources and from many different factors. Some such sources include blogs, customer reviews, professional reviews, surveys, and any publicly viewable posting. Some such factors include individual experiences, name recognition, and quality of goods and services. Credibility is spread by word-of-mouth, print publications, and published online posts.

The Internet has made the posting and dissemination of credibility information easier than ever before. Social media sites such as Facebook, Twitter, Yelp, and CitySearch have provided a platform with which each and every individual can influence the credibility of an entity, where the entity can include an individual or a business. People look to these sites because they trust what their friends, peers, or fellow consumers have to say. Also, these social media sites disseminate the credibility information in real-time. In other words, as soon as credibility information is posted to a social media site, that information is viewable by any other user of the site. Therefore, postings on these social media sites can have a significant impact on an entity's credibility, as these sites reach very large audiences in a relatively short period of time.

Consequently, entities are now taking more active roles in managing their credibility online. Specifically, entities monitor various websites in order to determine what others are saying about them. From these postings, targeted entities can identify what they are correctly and what they are doing incorrectly. Additionally, entities can respond to the postings to address complaints, provide customer support, and promote new goods and services. By identifying complaints as they occur in real-time or substantially contemporaneously therewith and responding to the complaints, an entity can improve its image or reputation for the purposes of realizing greater profitability, larger number of repeat clientele, better brand recognition, etc. Specifically, an entity can manage its credibility before it is too late by rectifying complaints before they are absorbed by potential future clientele that would then be dissuaded based on the absorbed complaints.

However, entities usually do not have sufficient resources to allocate to credibility management. In many instances, credibility management involves a manual process whereby the entity continually monitors different websites to view the latest credibility information. Due to the sheer number of different websites and volume of posts, the entity will often be unable to ingest every posting and respond in kind. Moreover, by the time the entity comes across a particular posting of interest, the entity may be too late to respond or be unable to respond as the window to respond may have closed.

Accordingly, there is a need to assist entities in managing their credibility online. There is a need to provide to a particular entity automated notification of postings that impact the credibility of that particular entity. There is a need to provide such notification in an omnipresent manner such that the particular entity is notified of any such postings irrespective of the site on which it is published. There is further a need to provide such notification in real-time so that the particular entity that is the target of such postings can respond to the postings to mitigate the detrimental impact that such postings can have on the credibility of the particular entity if the postings are left unaddressed over time.

SUMMARY OF THE INVENTION

It is an object of the present invention to define a system, methods, and computer software products to transform social media into a vehicle for credibility management. It is therefore an object to provide a platform and services that deliver online postings that impact entity credibility to the target entity in an automated, real-time, and omnipresent manner. It is further an object to provide a platform and services with which a target entity can respond to such postings in a real-time manner.

To achieve these and other objects, some embodiments provide an automated, omnipresent, and real-time credibility management system. The credibility management system aggregates feeds from one or more social media service providers and other online platforms to which users can publish posts that become viewable by others. The credibility management system performs natural language processing (NLP) on the aggregated posts. The NLP separates posts that impact credibility from posts that do not impact credibility. Next, the credibility management system forwards the identified posts impacting credibility to the entities that are the targets of those posts. In some embodiments, the credibility management system forwards posts to entities that have registered with the credibility management system and that have provided their contact information as part of the registration process. Accordingly, the credibility management system identifies where to forward a post by looking up an indentified target entity name against a registration database and if a match is found, the contact information for that target entity is obtained from the registration database and is used to forward the posts to the appropriate target entity.

In some embodiments, the target entity specifies policies that determine which posts it is to receive from the credibility management system. This may include receiving all posts that identify the target entity or certain posts that potentially impact the credibility of the target entity by some specified quantity as determined from a quantification of the post.

Some embodiments remove the identity of the poster from the post that is forwarded to the target entity. This is performed to allow the credibility management system to monetize some of the services that it offers. One such service is the ability for the target entity to respond to a poster. In some embodiments, target entities that are free or nonpaying users of the credibility management system are prevented from responding to a poster. However, target entities that are paying customers of the credibility management system will be able to respond to any forwarded post. Such users can prepare a response to any forwarded post. The credibility management system internally maintains the identity of the poster for each forwarded post such that when the response is received by the credibility management system, the response can be directed to the correct poster.

Using the credibility management system, an entity can in real-time identify posts that potentially affect its credibility. The credibility management system presents such posts from multiple social media sites so that the entity that is the target of the posts can have an omnipresent view over all such social media sites without having to manually monitor each of those sites. Moreover, by receiving the posts in real-time, the entity can respond in real-time. In so doing, the entity can mitigate the credibility impact that a posting can have on the entity's credibility if it was otherwise left unaddressed for a long period of time and absorbed by others. Responding to a post can cause the poster to remove the post, revise the post, or supplement the post with another post that improves the target entity's credibility. Specifically, responses can be used to (1) placate a poster that has had a poor experience with an entity, with a representative of the target entity, or with a good or service of the target entity, (2) correct a false statement published by the poster, (3) provide customer or technical support, (4) express gratitude for positive sentiment expressed by the poster, (5) provide the poster with news or information about upcoming events, goods, and services, and (6) submit a promotion, rebate, coupon, or the like to the poster.

BRIEF DESCRIPTION OF THE DRAWINGS

In order to achieve a better understanding of the nature of the present invention a preferred embodiment of the credibility management system and methods will now be described, by way of example only, with reference to the accompanying drawings in which.

DETAILED DESCRIPTION OF THE INVENTION

In the following detailed description, numerous details, examples, and embodiments of a credibility management system and methods are set forth and described. As one skilled in the art would understand in light of the present description, the system and methods are not limited to the embodiments set forth, and the system and methods may be practiced without some of the specific details and examples discussed. Also, reference is made to the accompanying figures, which illustrate specific embodiments in which the invention can be practiced. It is to be understood that other embodiments can be used and structural changes can be made without departing from the scope of the embodiments herein described.

As used herein "entity" refers to any individual or business, where agents or representatives of the business can communicate on its behalf. "Post" or "posting" includes any communication or message that is published to a digital medium and that is viewable by at least one entity that is unrelated to the "poster". A poster refers to the entity that published a post or posting. Posts or postings can include Facebook posts, Twitter tweets, Yelp reviews, Zagat ratings, blog posts, emails, instant messages, LinkedIn messages, and other communications published to social media sites. Social media sites refer to digital platforms or services that facilitate any form of social interaction through communication between at least two entities. Social media sites are embodied as websites, applications, or various services that network two or more entities. Some social media service providers include Facebook, Twitter, MySpace, Yelp, CitySearch, blogging services, instant messaging services, and any other service to which users can publish posts that become accessible to at least one other user.

Some embodiments provide a system for automated, real-time, and omnipresent management of credibility (hereinafter referred to as the credibility management system). Specifically, the credibility management system transforms social media into a notification and response vehicle, whereby posts that can impact the credibility of a particular business and that are published to any one of several social media service providers are automatically identified in real-time and forwarded to the particular business so that the particular business can respond in kind. The response may include taking ameliorative actions to mitigate the impact that such posts could potentially have on the credibility of the particular business, providing promotional materials, coupons, informational materials, or the like to encourage repeat business or word of mouth referrals, and providing customer or technical support to address issues expressed by the poster.

Figure 1:
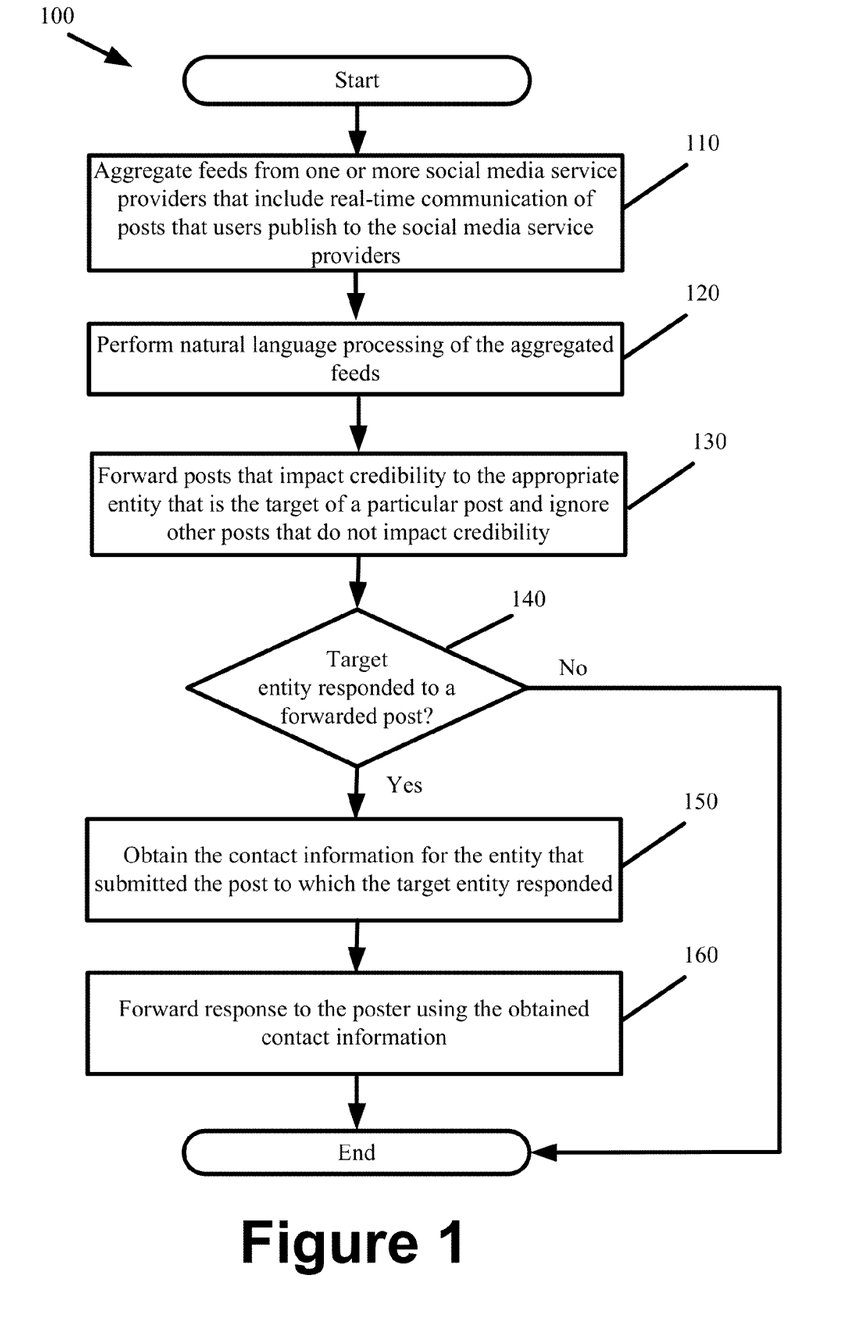
FIG. 1 presents a process for managing credibility using the credibility management system of some embodiments.

FIG. 1 presents a process 100 for managing credibility using the credibility management system of some embodiments. The process 100 commences by aggregating (at 110) feeds from one or more social media service providers. The feeds include live feeds, streaming feeds, or continuous feeds of posts that users publish to the social media service providers. The feeds can also include posts that are not real-time or posts that have been published for at least some defined amount of time. As part of aggregating the posts, the credibility management system stores two identifiers for each aggregated post. A first identifier identifies the social media service provider from which the post is aggregated from. The second identifier identifies the user of the social media service provider that submits the post that is aggregated. These identifiers are stored within the credibility management system to target and direct responses for the aggregated posts to the users that submitted the posts.

The credibility management system obtains the feeds and the corresponding identifiers from the social media service providers by interfacing with databases of these service providers, crawling the posts that are published to the service provider sites, or by employing other data pulling techniques. For instance, the credibility management system is provided access to one or more databases of a particular social media service provider that store posts published to that particular social media service provider and the credibility management system performs regular queries to these databases to identify and obtain newly published posts. Alternatively, the social media service providers may be configured to push the feeds to the credibility management system. For example, a particular social media service provider may publish a post received from one of its users on its own website at the same time as forwarding that post to the credibility management system.

In some embodiments, agreements are established between the credibility management system and the various service providers to enable the credibility management system access to the feeds directly from the various service providers. The feeds pass from the service providers to the credibility management system over an Internet Protocol (IP) based data network. The feeds may be encapsulated as a set of data packets with each data packet encoded with the text of one or more posts. In some embodiments, the credibility management system removes any specialized formatting from the aggregated posts in order to obtain the textual content from the posts. This allows the credibility management system to aggregate posts from different social media service providers irrespective of the formatting of the posts. The aggregated feeds are temporarily stored to a database of the credibility management system for processing.

The process performs (at 120) natural language processing (NLP) of the aggregated feeds. The NLP separates posts that impact credibility from posts that do not impact credibility. In some embodiments, posts that impact credibility identify one or more of a target entity, an object of the post, and an object modifier that connotes some degree of positivity or negativity in relation to the object. For example, a post containing the text "Restaurant X had bland food" includes the target entity "Restaurant X", the object "food", and the object modifier "bland". In some embodiments, NLP involves the automated parsing of the textual content for such a post based on an encoded set of grammatical rules, one or more dictionaries, and an entity database. The set of grammatical rules assist in relating target entities, objects, and object modifiers. The dictionaries specify words, phrases, or terms that can be identified as objects of a post. The dictionaries also specify words, phrases, or terms that connote some degree of positivity or negativity in relation to an identified object (i.e., object modifiers). The entity database stores identification information for different entities that are referenced in the aggregated posts and that can be targeted entities therein. The identification information can include one or more names, user handles, telephone numbers, mailing addresses, email addresses, domain names, and other such identifiers. As will become evident from the discussion below, the identification of the targeted entities is performed so that the posts can be presented to the appropriate entity and to allow the appropriate entity the ability to reply to the poster.

The process forwards (at 130) posts that have been identified by the NLP to impact credibility to the appropriate entities that are the targets in those posts and ignores other posts that have been identified by the NLP to not impact credibility. In some embodiments, the process forwards posts to target entities that have registered with the credibility management system. This includes providing a customized graphical user interface for each entity that is registered with the credibility management system. Once a particular registered entity accesses the GUI, the credibility management system customizes the GUI for that entity such that the GUI presents the aggregated posts that target that entity and that potentially impact the credibility of that entity. Certain critical posts that can result in a large impact to the entity's credibility can be highlighted or otherwise differentiated so as to draw the attention of the entity to those critical posts. In some embodiments, the GUI presents the posts in a list format with each post having a timestamp to identify when that post was published.

Additionally or alternatively, the credibility management system sends posts targeting a specific entity directly to that entity. In some such embodiments, a lookup of an identified target entity is performed against the entity database. If a match is found, the contact information for that target entity is obtained from the database and the posts are forwarded to the target entity based on the obtained contact information. This provides the entity with immediate notification of posts that target that entity. This may include email notification, instant message notification, text message notification, and telephone message notification as some examples.

Next, the process polls (at 140) an interface to determine whether a target entity has responded to a forwarded post. When a response is received, the process obtains (at 150) the contact information for the entity that submitted the post being responded to. The contact information is based on the first and second identifiers that were aggregated with the post. As noted above, these identifiers specify a username or handle of the user that submitted the post and the social media site from which the post was aggregated. Based on the obtained contact information, the process forwards (at 160) the response to the entity. Specifically, the credibility management system uses the identifier to access an account that the credibility management system has registered at the social media site from which the post is aggregated and the credibility management system submits the response to the handle or username of the posting entity from that account on behalf of the responding entity. In this manner, the credibility management system brokers communications between posters and target entities. In some embodiments, this is done to preserve the identity of the posters and to provide a mechanism with which to monetize the services of the credibility management system. However, it should be apparent that the credibility management system of some embodiments provides the poster contact information to the appropriate target entities so that the target entities can directly contact the posters (i.e., users that submitted posts targeting the particular entity).

When a response is not received, the process continues to poll (at 140) the interface or the process ends. In some embodiments, the process 100 is continually performed so long as new posts are aggregated from the various social media service providers.

Figure 2:
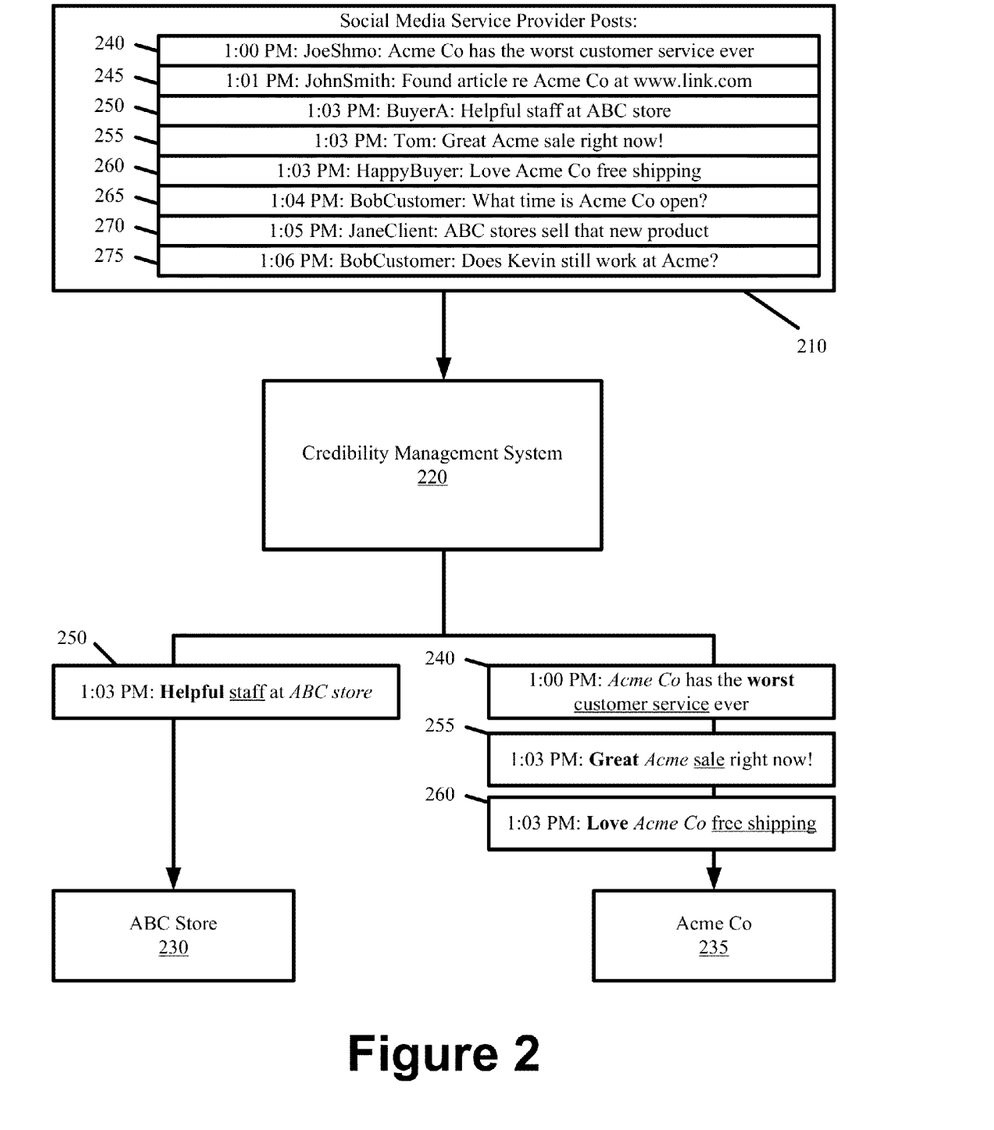
FIG. 2 conceptually illustrates using the credibility management system to manage one's credibility in accordance with some embodiments.

FIG. 2 conceptually illustrates using the credibility management system to manage one's credibility in accordance with some embodiments. The figure illustrates (1) a set of user submitted posts 240-275 that are published by a social media service provider 210, (2) the credibility management system 220, (3) a first target entity 230 ("ABC Store"), and a second target entity 235 ("Acme Co"). In this figure, the target entities 230 and 235 have previously registered with the credibility management system 220 in order to receive the credibility management services described below and with reference to FIG. 1.

The credibility management system 220 aggregates the user submitted posts 240-275 from the social media service provider 210. In some embodiments, the aggregation is performed in real-time as the users submit the posts 240-275 or as the social media service provider 210 publishes the posts 240-275. As a result of the aggregation, the credibility management system 220 obtains the textual content of the posts 240-275 irrespective of how the posts are aggregated and irrespective of the formatting of the posts published by the social media service provider 210.

The credibility management system 220 also identifies and stores contact information regarding the poster that submitted a post that potentially impacts credibility of a target entity.

The contact information for the poster can be obtained directly from the post. For example, when the post is a Twitter tweet, the tweet will include the handle name of the user that submitted the tweet and when the post is a Facebook post, the post will include the account name of the user that submitted the post. That handle name or account name can be used to respond to the user that submitted the tweet. In some embodiments where the contact information cannot be directly obtained from the post, the credibility management system 220 submits a query to the social media service provider from which a post is aggregated to obtain the contact information for a user that submitted a post. In some embodiments, the contact information is stored as first and second identifiers with the first identifier identifying the user that submitted the post and the second identifier identifying the social media site that was used by the user to submit the post.

It should be apparent to one of ordinary skill in the art that FIG. 2 illustrates the credibility management system 220 aggregating posts from a single social media service provider 210 for exemplary purposes and for purposes of simplicity. However, the credibility management system 220 typically operates to aggregate posts from multiple social media service providers. In this manner, the credibility management system 220 becomes omnipresent and provides each registered target entity with a comprehensive and holistic view of the posts that can potentially impact credibility irrespective of where such posts are published.

Once the posts 240-275 have been aggregated, the credibility management system 220 processes the posts 240-275 to identify those posts that potentially impact credibility from those posts that do not. Specifically, the processing identifies an entity that is the target of the post, an object, and a modifier for that object. Once the credibility management system identifies a post having a target entity, object, and object modifier, then that post is identified as one that potentially impacts credibility. A post omitting one or more of a target entity, object, and object modifier is identified as one that does not impact credibility. For example, the post "I went to BusinessA for coffee today" includes the target entity "BusinessA" and object "coffee", but lacks an object modifier for the object. Therefore, this post is identified as one that does not potentially impact the credibility of the target entity. Conversely, the post "BusinessA has the best coffee" includes the target entity "BusinessA", object "coffee", and object modifier "best" such that it is identified as one that can potentially impact the credibility of the target entity.

Based on the processing of the aggregated posts 240-275, the credibility management system 220 identifies posts 240, 250, 255, and 260 as posts that potentially impact credibility, whereas posts 245, 265, 270, and 275 are identified as being unrelated to credibility. Accordingly, posts 240, 250, 255, and 260 are identified as a result of the processing performed by the credibility management system 210 to include a target entity, object, and object modifier. These elements (i.e., the target entity, object of the post, and object modifier) are illustrated in the figure by italicizing the words representing the target entities, underlining the words representing the object of the post, and bolding the words representing the object modifier.

The credibility management system 220 forwards the identified posts that potentially impact credibility (e.g., posts 240, 250, 255, and 260) to the proper entity that is the target of those posts. As shown, the credibility management system 220 forwards post 250 to the entity 230 and the credibility management system 220 forwards posts 240, 255, and 260 to the entity 235. Forwarding the posts involves notifying the entity via email, instant message, or other real-time communication. In some embodiments, forwarding the posts may also involve non real-time communications. In some embodiments, only entities that have registered with the credibility management system 220 will receive posts that have been identified as potentially impacting credibility. During registration with the credibility management system 220, the entities specify a preferred form of communication for receiving the forwarded posts. Therefore, when a target entity is identified within a post during processing, the credibility management system 220 performs a look-up to a credibility management system database to determine whether the identified target entity is registered with the credibility management system. If not, the post is discarded. Otherwise, the target entity in the identified post will match to an entity that has registered with the credibility management system, the contact information for the target entity is retrieved, and the contact information s used to forward the post to the target entity.

In some embodiments, the credibility management system 220 conceals the contact information of the poster before forwarding a post to a target entity. For example in FIG. 2, the credibility management system 220 removes the handles for the users that submitted posts 240, 250, 255, and 260. In some embodiments, poster contact information is removed to maintain the privacy of the poster. In some embodiments, poster contact information is removed to provide tiered services. In some such embodiments, a particular entity that registers with the credibility management system for free will be forwarded posts that have been identified to potentially impact the credibility of the particular entity, but that particular entity will be unable to respond to the posters directly. However, a particular entity that registers with the credibility management system and that pays a service fee or subscription fee will be forwarded posts that have been identified to potentially impact the credibility of the particular entity, and the particular entity will be permitted to directly respond to the corresponding posters. In some embodiments, responding to a poster includes responding using the same medium that the poster used to submit the post. For example, if the post was submitted as a Twitter tweet, the response will include a reply tweet; if the post was submitted as a Facebook public post, the response will include a reply public post to the Facebook account of the poster; and if the post was submitted as a blog posting, the response will include a blog posting on the same site. The credibility management system submits the responses on behalf of the registered entities using the first and second identifiers that were stored for each aggregated post, wherein the identifiers specify where and how the responses should be submitted to the user that submitted the post that is being responded to. It should be apparent that the foregoing is merely an exemplary listing and is not intended to be a comprehensive listing of the different forms with which posters and target entities can post and respond. Accordingly, any form of social media communication is supported by the credibility management system.

A target entity can respond to a post in many different ways. The target entity may respond to a poster in order to (1) resolve an issue that the poster had with a good or service of the target entity, (2) provide customer support, technical support, or other forms of troubleshooting, (3) placate a poster that has had a poor experience at a store, with a representative of the target entity, or with a good or service of the target entity, (4) correct a false statement published by the poster, (5) express gratitude for positive sentiment expressed by the poster, (6) provide the poster with news or information about upcoming events, goods, and services, and (7) submit a promotion, rebate, coupon, or the like to the poster. It should be apparent that the target entity is free to respond in any desired manner. In addition to or instead of directly responding to a poster, the target entity can monitor the forwarded posts to ascertain its credibility within the marketplace and to make any internal changes necessary as a result. For example, if the target entity continually sees posters complaining about a particular issue in the forwarded posts, then the target entity can make internal changes to address the particular issue such that future clients are better served.

In this manner, the credibility management system provides real-time omnipresent monitoring of entity credibility. Moreover, the credibility management system allows entities to respond in real-time or near real-time to the identified posts. By enabling an entity to quickly respond, the entity is better able to mitigate the impact that a potentially damaging post can have on its credibility if the post was left unaddressed for a long period of time. Quickly responding to a post can result in the poster removing a damaging post or revising a damaging post to note that an issue has been resolved or was immediately addressed by the target entity. Quickly responding to a post can create goodwill that encourages repeat business and word-of-mouth referrals. Additionally, the credibility management system promotes a new form of customer service and customer support. Specifically, the credibility management system transforms existing social media service providers into vehicles through which businesses can identify issues experienced by their clients and resolve those issues in a prompt manner.

Figure 3:
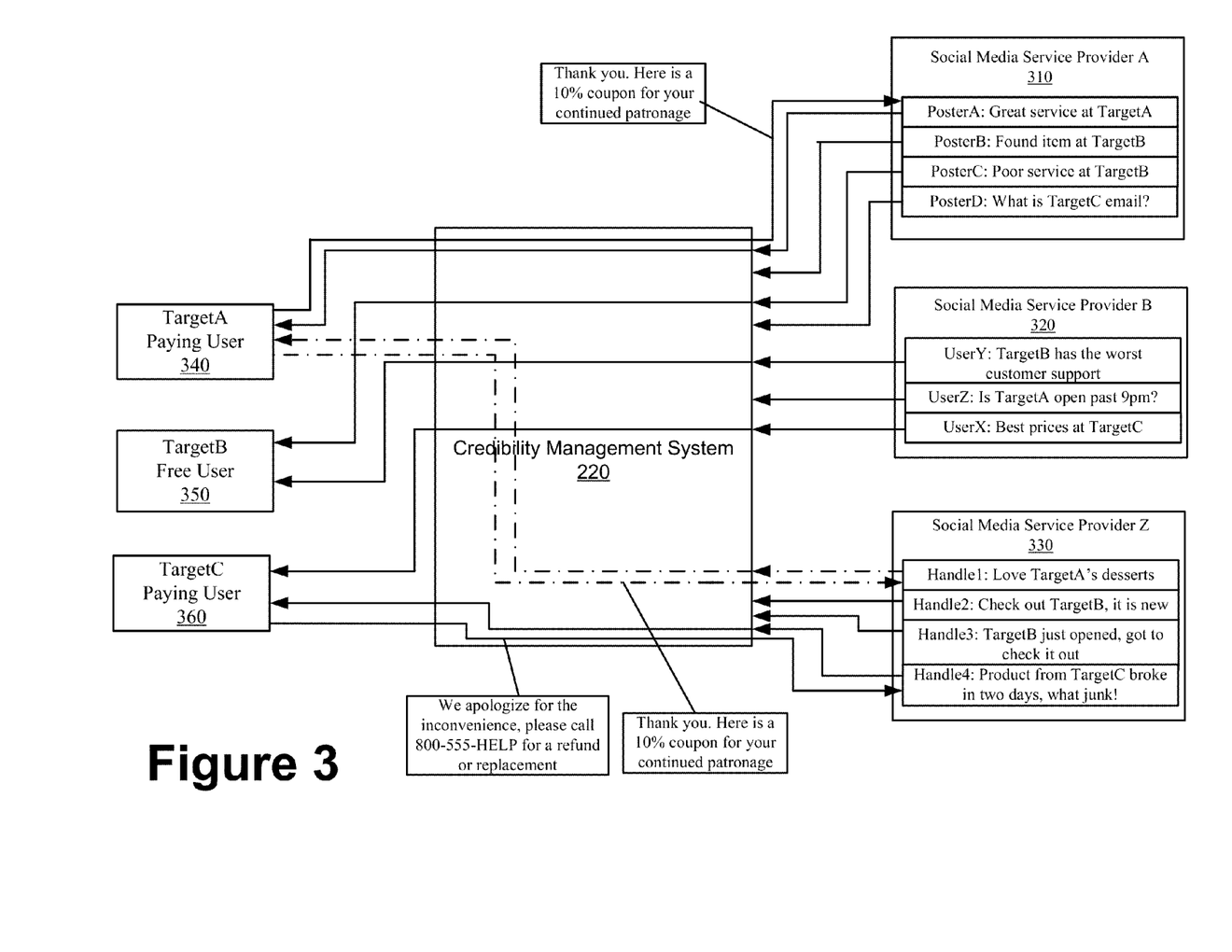
FIG. 3 further illustrates the automated real-time omnipresent services provided by the credibility management system in accordance with some embodiments.

FIG. 3 further illustrates the automated real-time omnipresent services provided by the credibility management system 220 in accordance with some embodiments. The figure illustrates the credibility management system 220, social media service providers 310, 320, and 330, and target entities 340, 350, 360. The target entities 340-360 have registered with the credibility management system 220 in order to receive the automated real-time omnipresent notification of posts from the credibility management system 220.

The target entities 340 and 360 are paying customers of the credibility management system 220 and the target entity 350 is a registered free user of the credibility management system 220. As a result, the credibility management system 220 identifies any posts that target a particular entity of the target entities 340-360 and the credibility management system 220 forwards the identified posts to the particular entity. In this figure, only paying entities 340 and 360 are able to respond to the forwarded posts, while the registered free entity 350 is not able to do so.

The credibility management system 220 aggregates and processes all posts that are published to the service providers 310-330. The processing identifies those posts that potentially impact credibility of any of the target entities 340-360. When a post that potentially impacts the credibility of the target entity 340 is identified, the credibility management system 220 forwards that post to the target entity 340; when a post that potentially impacts the credibility of the target entity 350 is identified, the credibility management system 220 forwards that post to the target entity 350; and when a post that potentially impacts the credibility of the target entity 360 is identified, the credibility management system 220 forwards the post to the target entity 360.

Figure 4:
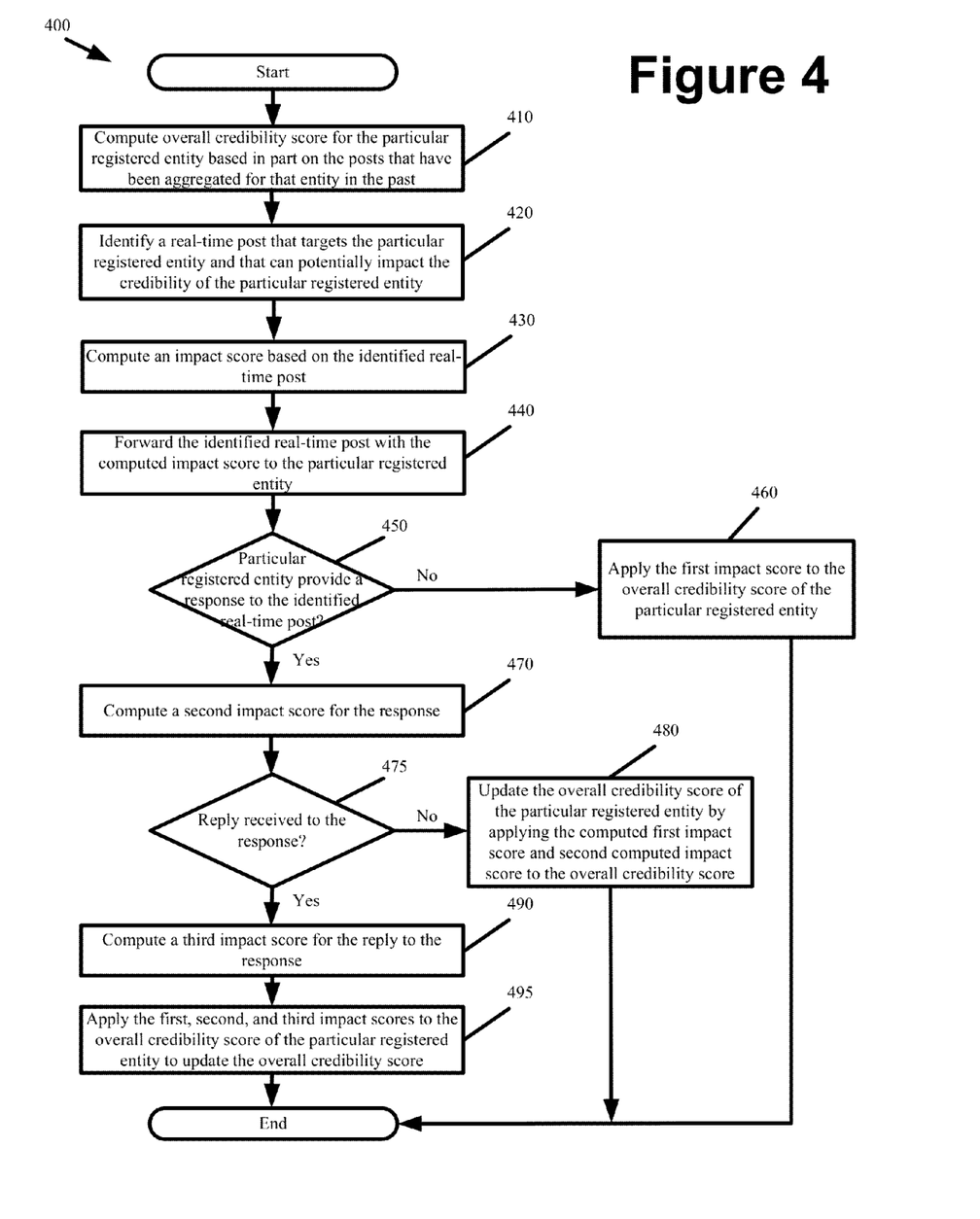
FIG. 4 presents a process for facilitating active credibility management through the credibility management system in accordance with some embodiments.

The credibility management system can be enhanced to facilitate active credibility management by encouraging the registered entities to respond to the posts that target them. FIG. 4 presents a process 400 for facilitating active credibility management through the credibility management system in accordance with some embodiments. The process 400 is performed by the credibility management system and is applicable to each registered entity, but is shown with respect to a particular registered entity for purposes of simplicity.

The process 400 commences by computing (at 410) an overall credibility score for the particular registered entity based in part on the posts that have been aggregated some time in the past for that entity. The credibility score numerically quantifies the reputation or credibility of the particular registered entity based on the positive and negative sentiment that is expressed in the aggregated posts. The time frame for the aggregated posts can be any duration that extends in the past but that does not include real-time aggregated posts. To compute the credibility score, each aggregated post is processed to identify the object and object modifier of the post. Then a scale of values is selected based on the object and a value in the scale of values is selected based on the degree of positivity or negativity expressed in the object modifier. For example, posts that have been aggregated for a restaurant may include the objects "food" and "decor" and object modifiers "excellent" for food and "plain" for decor. The credibility of the restaurant is more greatly affected by the food its serves than by its decor. Accordingly, the credibility management system assigns a first scale of values to the object food and a second scale of values that is weighted less heavily than the first scale of values to the object decor. Since the object modifier "excellent" expresses a high degree of positivity in comparison to other object modifiers such as "horrible", "bad," "ok", "good", and "great", the credibility management system selects a high value in the first scale of values, while selecting a middle to low value in the second scale of values based on the object modifier "plain". The selected values represent component credibility scores that collectively derive the overall credibility score.

In some embodiments, the scores are computed by converting the object modifier into a quantified value and by converting the object of the object modifier into a scalar value. The scalar value is then used to adjust the quantified value. The quantified value for the object modifier is derived depending on the degree of positivity or negativity of the object modifier. For example, the object modifier "good" may be assigned a positive value of 5, the object modifier "great" may be assigned a positive value of 7, and the object modifier "best" may be assigned a positive value of 10. The scalar value for the object is derived based on the importance of the object being modified. For example, the object "overall experience" should have a greater impact on business credibility than the object "quality", and the object "quality" should have a greater impact than the object "decor". Accordingly, the object "overall experience" can be assigned the scalar value 1.0, the object "quality" can be assigned the scalar value 0.7, and the object "service" can be assigned the scalar value 0.5. These values can then be used to quantify the impact that a particular post can have on the credibility of an entity that is the target of the post.

The component credibility scores for all processed aggregated posts are combined to generate the overall credibility score. In some embodiments, the scores are also weighted based on the timestamp of the aggregated posts from which the scores are derived. Newer posts can thus impact the generated overall credibility score greater than older posts, thereby causing the credibility score to reflect more so on the credibility that is expressed in recent posts than the credibility that is expressed in older posts. In some embodiments, step 410 for computing the overall credibility score for the particular registered entity is performed at specified times such that an up-to-date score is always available.

The process then identifies (at 420) a real-time post that targets the particular registered entity and that can potentially impact the credibility of the particular registered entity. This post is identified as a result of the continual post aggregation and post processing that is described above.

The process computes (at 430) a first impact score based on the identified real-time post. The impact score identifies the impact that the real-time post will have on the overall credibility score of the particular registered entity. The impact score is computed in much the same way as the individual component scores that comprise the overall credibility score. Specifically, a scale of values is selected based on the object of the real-time post, then a value within the scale of values is selected based on the object modified of the real-time post. The significance of the object and the degree of positivity or negativity that is expressed in the object modifier determines how much of an impact the impact score is to have on the credibility score. More specifically, if the object modifier for the real-time post expresses positive sentiment, then the impact score for the real-time post is one that would improve or increase the overall credibility score and if the object modifier for the real-time post expresses negative sentiment, then the impact score for the real-time post is one that would lessen or decrease the overall credibility score.

The process forwards (at 440) the identified real-time post with the computed first impact score to the particular registered entity. The first impact score facilitates the active management of credibility as it quantifiably identifies how one's credibility will change as a result of new posts. Moreover, the targeted entity is made aware of the impact as it happens, allowing the entity an opportunity to respond in a timely and meaningful manner, wherein a timely and meaningful response can mitigate or improve the impact that the real-time post has on the targeted entity's credibility. Accordingly, the process determines (at 450) if the particular registered entity provides a response to the identified real-time post. The process receives all such responses because the credibility management system provides the interface between the particular registered entity and the entity that submitted the post targeting the particular registered entity. More specifically, the credibility management system conceals the contact information of the poster from the targeted entity such that the targeted entity first submits its response to the credibility management system and the credibility management system then routes the response to the appropriate social media service provider in order to reach the entity that submitted the post that is being responded to.

If no response is received, the process applies (at 460) the first impact score to the overall credibility score of the particular registered entity. However if a response is received, the response is processed to determine if it positively or negatively impacts the overall credibility score of the particular registered entity beyond the impact of the first impact score. The processing produces a second impact score that is based on the positivity and negativity expressed in the response and is also based on the timeliness of the response. For instance, if the particular registered entity submits a response to resolve an issue that the posting entity had with regards to the particular registered entity, that response will mitigate some of the negative impact that the post would have on the overall credibility of the particular registered entity, thereby improving the overall credibility score of the particular registered entity. Responses that can positively impact the credibility of the particular registered entity include addressing customer issues or complaints, providing coupons, rebates, and other promotions, answering customer questions in a timely manner, providing troubleshooting, thanking an entity for submitting a post about the particular registered entity, etc. Responses that can negatively impact the credibility of the particular registered entity include responses that contain words or phrases connoting negativity. These can include the particular registered entity denying or ignoring fault, arguing, or otherwise responding to the entity submitting the post in a confrontational manner. Also, a response to a post that is submitted within ten minutes of that post being aggregated will produce a greater positive impact than a response that is submitted four days of the post being aggregated. Accordingly, the process computes (at 470) a second impact score for the response based on the processing of the response.

Next, the process determines (at 475) whether the entity submitting the post targeting the particular registered entity submits a followup reply that is in reply to the response of the particular registered entity. If no reply to the response of the particular registered entity is received, the process updates (at 480) the overall credibility score of the particular registered entity by applying the first computed impact score and the second computed impact score to the overall credibility score. However, if a reply to the response of the particular registered entity is received, the process computes (at 490) a third impact score based on the positivity or negativity expressed in the reply and the process applies (at 495) the first, second, and third impact scores to the overall credibility score of the particular registered entity to update the overall credibility score. Specifically, the reply can further positively or negatively impact the overall credibility score of the particular registered entity. For example, the response provided by the particular registered entity can resolve an issue that the poster had, and the poster acknowledges that the issue has been resolved in its reply such that the credibility management system negates any negative impact that the original post would have had on the credibility score of the particular registered entity. In fact, the credibility management system may improve the overall credibility score when the reply identifies a resolved issue and a satisfied entity.

The impact scores are stored to a database of the credibility management system and are reclassified as component credibility scores once they are applied to update the overall credibility score. This provides a history for how the credibility of an entity changes over time and can be used to generate histograms or trends for how the credibility of the entity changes. Additionally, the credibility management system may provide the various credibility scores to the social media sites. The social media sites can then publish the scores adjacent to the posts that were quantified by the scores. Alternatively, the social media sites can present the overall credibility score of an entity adjacent to the profile or account of the entity such that the overall credibility scores are viewable not just at the credibility management system but at other social media sites with registered entity accounts.

Figure 5:
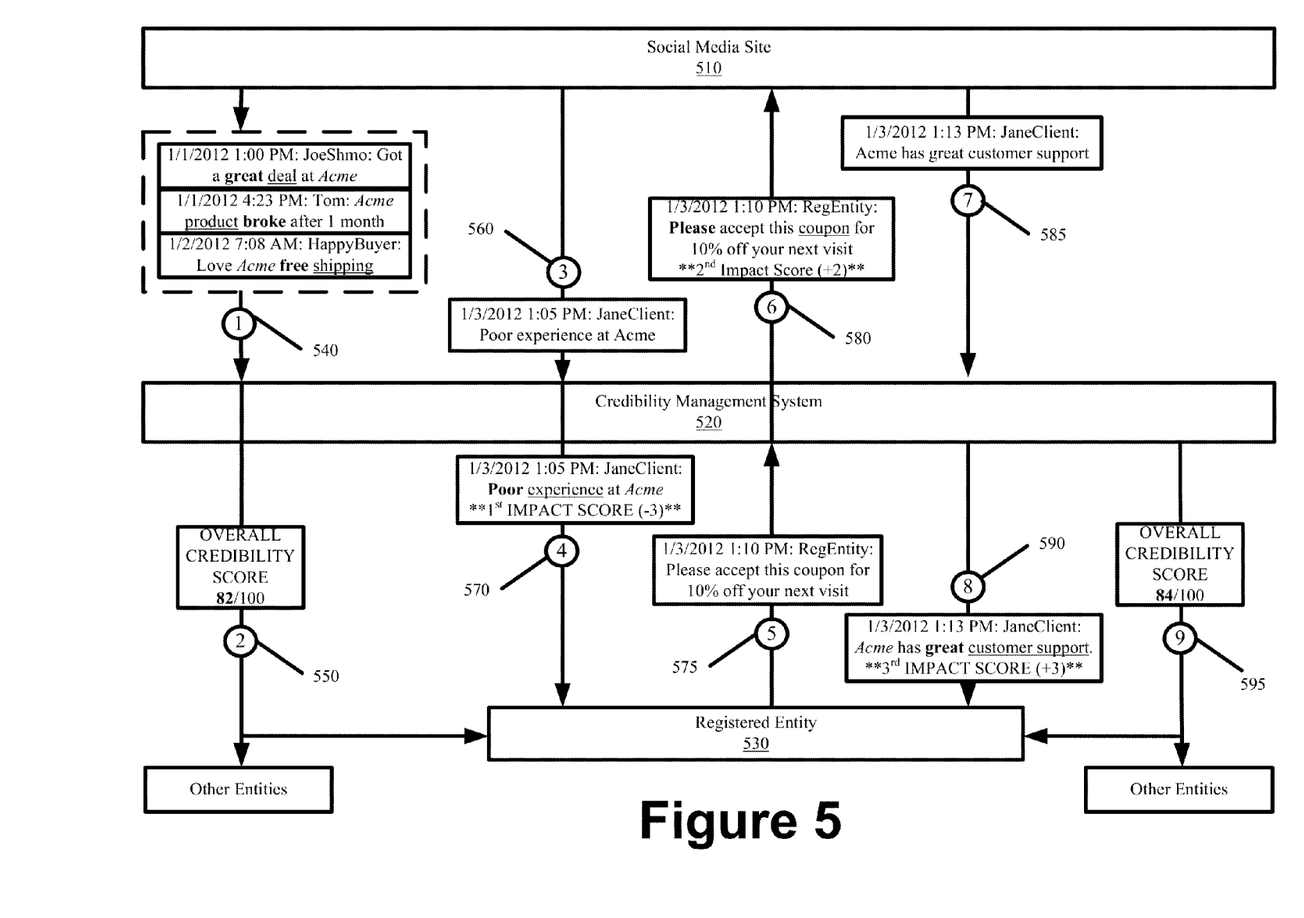
FIG. 5 conceptually illustrates impacting the credibility score of a particular registered entity in accordance with the process of FIG. 4.

FIG. 5 conceptually illustrates impacting the credibility score of a particular registered entity in accordance with process 400 of FIG. 4. The figure illustrates a social media site 510, the credibility management system 520, and a particular registered entity 530 of the credibility management system 520. Various entities publish posts to the social media site 510 that target other entities including the particular registered entity 530. The credibility management system 520 has a feed to the social media site 510 that allows the credibility management system 520 to aggregate the posts from the social media site 510. Using this feed, the credibility management system 520 identifies (at 540) a set of aggregated posts that target the particular registered entity 530. From the set of aggregated posts, the credibility management system computes an overall credibility score to quantify the credibility of the particular registered entity 530. The overall credibility score is presented to the particular registered entity 530 and also other entities that access the credibility management system 520 to query for the credibility of the particular registered entity 530. For instance, the credibility management system 520 may provide a network accessible interface with a search box that allows any entity to query for the credibility score of any other entity.

When a new post targeting the particular registered entity 530 is submitted to the social media site 510, the credibility management system 520 aggregates (at 560) the post in real-time. Before forwarding the post to the particular registered entity 530, the credibility management system 520 computes a first impact score to identify the impact that the post will cause to the credibility of the particular registered entity 530. In this figure, it is assumed that the post expresses negative sentiment that is quantified by the credibility management system 520 to reduce the overall credibility score of the particular entity 530 by a value of 3. The credibility management system 520 then forwards (at 570) the real-time post with the computed first impact score to the particular registered entity 530.

The particular registered entity 530 realizes the impact to its credibility from the first impact score and/or from reading the forwarded post. The particular registered entity 530 submits (at 575) a response to then mitigate the impact. As illustrated in the figure, the forwarded post specifies a poor experience with the particular registered entity 530 and in response the entity 530 provides a coupon to entice a return visit. The credibility management system 520 processes the response to identify that the entity 530 is making a timely response to positively resolve the situation with the original poster. Accordingly, the credibility management system 520 computes (at 580) a second impact score to reflect the positive response and the credibility management system 520 sends the response to the social media site 510 in order for the response to reach the originator of the real-time post. In this figure, the response impacts the overall credibility score by raising the credibility of the particular registered entity 530 by a value of 2.

The credibility management system 520 aggregates (at 585) a reply to the response of the particular registered entity 530. The credibility management system 520 processes the reply to identify that is from the same originator that submitted the real-time post aggregated at 560 and that is for the particular registered entity 520 within a specific temporal window. These factors assist in identifying the post as being a reply to the response. The credibility management system 520 then computes (at 590) a third impact score based on the positivity or negativity expressed in the reply and also optionally based on other factors such as the timeliness of the response. In this figure, the credibility management system 520 computes a third impact score to identify that the reply will increase the overall credibility score of the particular registered entity 530 by a value of 3 based on positivity expressed in the reply.

The credibility management system then applies (at 595) the first, second, and third impact scores to update the overall credibility score of the particular registered entity 530. As a result of the sequence of message exchanges and promptness with which the particular registered entity 530 acted to resolve customer issues, the overall credibility score of the particular registered entity 530 is increased by a value of 2.

Potential clientele that then see the message exchanges at the social media site 510 and the credibility score provided by the credibility management system 520 can then be persuaded to conduct business with the credibility management system 520 as a result of the timely responsiveness and positive credibility. Over time, this can result in new customers, a greater number of returning customers, and improved profitability as a result of the services provided by the credibility management system 520.

Figure 6:
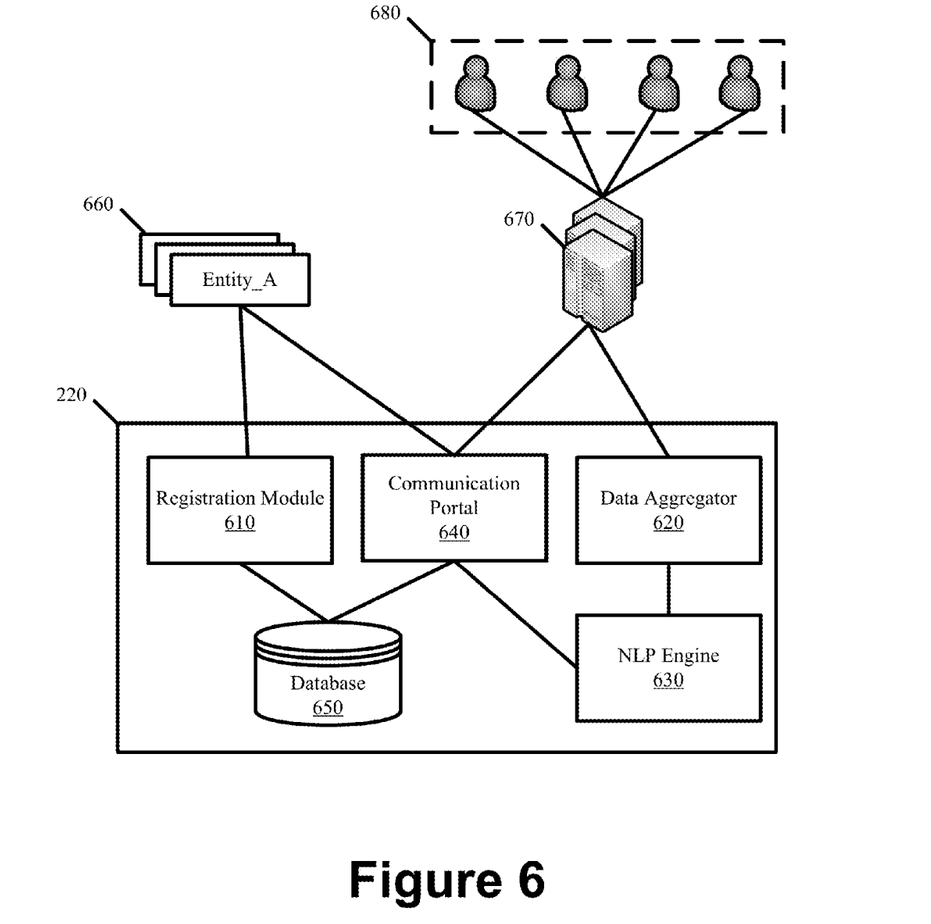
FIG. 6 presents various components for implementing the credibility management system in accordance with some embodiments.

FIG. 6 presents various components for implementing the credibility management system 220 in accordance with some embodiments. As shown, the credibility management system 220 includes a registration module 610, data aggregator 620, natural language processing (NLP) engine 630, communication portal 640, and database 650. Some or all of these components 610-650 are embodied as software applications or processes that execute on one or more physical computing devices. Collectively, the components 610-650 transform general purpose computing resources of the computing devices to implement and perform the specified credibility management functionality described above. In other words, the computing devices on which the credibility management system 220 executes comprise general purpose processors, random access memory, non-volatile storage, and network resources that are transformed by the components 610-650 of the credibility management system 220 into one or more specific purpose machines that automatedly and in real-time perform omnipresent identification and forwarding of posts that can potentially impact the credibility of a target entity while also providing tools for the target entity to respond in real-time to the forwarded posts in order to resolve issues and mitigate any impact that the posts can have on the credibility of the target entity. FIG. 6 also illustrates entities 660 that register for service with the credibility management system 220, social media service providers 670 that are communicably coupled to and provide feeds to the credibility management system 220, and users 680 that submit posts to the social media service providers 670.

The registration module 610 registers entities 660 so that they may access services of the credibility management system 220. Specifically, an entity registers with the credibility management system 220 in order to obtain a holistic real-time view of its credibility as it exists on various social media sites based on the posts that target that entity and that are published to those various social media sites by other entities. Registration is performed when an entity first interfaces with the credibility management system 220. However, it should be apparent that the entity can update its registration information at any time.

In some embodiments, registration involves an entity directing its Internet browser to a registration website that is controlled by the registration module 610. At the registration website, the registration module 610 prompts the entity to enter a username, a password, identification information, and contact information. The identification information specifies one or more names that are used to match against target entities identified within the aggregated posts. For example, if a particular registrant specifies the name "Acme Inc." and a set of aggregated posts identify the target entity "Acme Inc.", "Acme Co.", or "Acme", then those set of aggregated posts will be forwarded to that particular registrant. Since different entities can have the same name in different geographic regions, some embodiments request that the identification information be supplemented with additional information such as a geographic region, address, industry, class of goods or services, etc. In some embodiments, the supplemental information is used during NLP to more accurately identify the target entity based on additional elements that may be present within the post, metadata associated with the post, or the user submitting the post. The contact information specifies how the credibility management system 220 is to forward posts and associated impact scores to the registrant. The registrant can specify an email address, a Twitter account, a Facebook account, an instant message account, a telephone number that is capable of receiving a text message or an SMS message, or any other form of digital communication for the contact information. Digital communication allows for posts to be forwarded to the registrant in real-time. Additionally, the aggregated posts may be presented via a website or other interface hosted by the credibility management system 220 that the various entities can access at any time. In some embodiments, the website presents all aggregated posts for a specific entity in the order the posts were submitted. Also, the posts may be presented with the impact or component credibility scores that were computed for those posts.

In some embodiments, the registration module 610 allows the registrant to specify various policies that filter which posts are forwarded to the registrant. For example, a policy can be set so that only positive posts are forwarded to the registrant, a policy can be set so that only negative posts are forwarded to the registrant, or a policy can be set so that posts having a certain range of computed impact scores are forwarded to the registrant (e.g., a post containing the object modifier "bad" would not be forwarded, but a post containing the object modifier "terrible" would be forwarded). The registration information is stored to the database 650.

The data aggregator 620 aggregates user submitted posts from the various social media service providers 670 in a real-time and omnipresent manner. The data aggregator 620 also aggregates and stores identifiers for each aggregated post with the identifiers specifying the social media site from which the post is aggregated and the user of the social media site that submitted the post. The data aggregator 620 aggregates posts as soon as they are published to a social media service provider. The data aggregator 620 performs omnipresent data aggregation by simultaneously aggregating data from many different social media service providers.

To perform the data aggregation, the data aggregator 620 may establish a partnership with the various social media service providers 670 such that user submitted posts are automatically pushed to the credibility management system 220 as they are posted to the social media service providers 670. Alternatively, a partnership may be established with the social media service providers 670 such that the data aggregator 620 can pull the user submitted posts from a database or other interface of the social media service providers 670 on a continual or intermittent basis. In some embodiments, the data aggregator 620 acquires the user submitted posts by accessing websites of the social media service providers 670 and by extracting posts that have been published to the websites using a data crawling tool, data scraping tool, or other data extraction tool.

The posts aggregated by the data aggregator 620 are passed to the NLP engine 630 for processing. The NLP engine 630 processes each of the aggregated posts to identify posts that can potentially impact credibility from posts that do not impact credibility. Posts that can potentially impact credibility contain a target entity, an object of the post, and an object modifier that connotes some degree of positivity or negativity in relation to the object as a post that impacts credibility.

To identify posts containing a target entity, the NLP engine 630 of some embodiments compares words appearing within the posts to the registrant provided identification information that is stored in the database 650. When a word in a post matches a registered name in the database 650 by a specified degree, then a post is found having a target entity. Alternatively, a target entity can be identified using identification information that is recorded in entity databases that are often used for credit reporting purposes, financial reporting purposes, or the like. Some such entity databases are managed by Dun & Bradstreet, Experion, TransUnion, and the Secretary of State of each state as some examples. Still another technique for identifying posts containing a target entity is to perform grammatical analysis of the post.

To identify object modifiers within the aggregated posts, the NLP engine 630 matches words appearing within the aggregated posts against a list of predefined object modifiers (i.e., dictionary). Object modifiers can include adjectives for example. The object of the object modifier is then identified using grammatical analysis.

In some embodiments, the NLP engine 630 computes a credibility score for posts that are identified to potentially impact credibility. The computation of the overall credibility score, component scores, and impact scores is described above with reference to FIG. 4. In some embodiments, the NLP engine 630 is implemented using proprietary algorithms, though the NLP engine 630 can also be implemented using commercially available tools to perform the analysis, identification, and quantification of the target entity, object, and object modifier. One such tool is the Alchemy API developed and sold by Orchestr8, LLC.

The communication portal 640 receives posts that have been identified by the NLP engine 630 as potentially impactful to a target entity's credibility. The communication portal 640 forwards each identified post to the entity that is the target of the post. To do so, the communication portal 640 identifies the target entity that is identified by the NLP engine 630. The communication portal 640 obtains the contact information for the target entity from the database 650 based on registration information that the target entity provided to the registration module 610 at the time of registration. The communication portal 640 then forwards the post to the target entity.

In some embodiments, the communication portal 640 retrieves and applies target entity specified policies to the received posts prior to forwarding the posts to the target entity. Any policies specified by the target entity at the time of registration or some subsequent time are stored to and retrieved from the database 650. By specifying policies, the target entity can filter which posts are forwarded to it. For example, policies can be set so that only posts positively impacting credibility are forwarded to the target entity, policies can be set so that only posts negatively impacting credibility are forwarded to the target entity, or policies can be set so that posts with a particular credibility impact are forwarded to the target entity. Policies can also set temporal restrictions such that posts published during particular time periods or dates are forwarded to the target entity.

In some embodiments, the communication portal 640 extracts the identity of the poster from the post before forwarding the post to the target entity. In most instances, this involves extracting the handle name or username that is included with the post. However, other extraction may be necessary such as extracting metadata from the post. When the identity of the poster is extracted, the communication portal 640 internally maintains the identity of the poster. The communication portal 640 also creates a response link that is forwarded with the post. The response link associates the identity of the poster with the forwarded post. If the target entity receiving the post chooses to invoke the response link and respond to the post, the response from the target entity is submitted to the communication portal 640 and the communication portal 640 then submits the response to the poster based on the internally maintained identity.

The communication portal 640 also interfaces with the various social media sites in order to submit responses using messaging of those sites in order for the responses to be forwarded to the entity that submitted the post being responded to. Also, the communication portal 640 may present the various interfaces with which the credibility scores for different entities can be queried and with which a history of posts that have been aggregated for different entities can be viewed in association with impact scores.

As described above the credibility management system 220 may monetize its services by allowing only registered paying entities to respond to forwarded posts. However, it should be apparent that other forms of monetization are possible. For example, the credibility management system can charge a first fee for entities to become registered in order to receive forwarded posts and a second fee to respond. Alternatively, different fees can be charged depending on which social media service providers the posts are to be aggregated from. In some such embodiments, the registered entities can specify at the time of registration which service providers they would like the credibility management system to aggregate and forward posts from. For each specified service provider, the credibility management system can increment the same fee or a different fee.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Computer and computer system are meant in their broadest sense, and can include any electronic device with a processor including cellular telephones, smartphones, portable digital assistants, tablet devices, laptops, and desktops. Examples of computer-readable media include, but are not limited to, CD-ROMs, flash drives, RAM chips, hard drives, EPROMs, etc.

Figure 7:
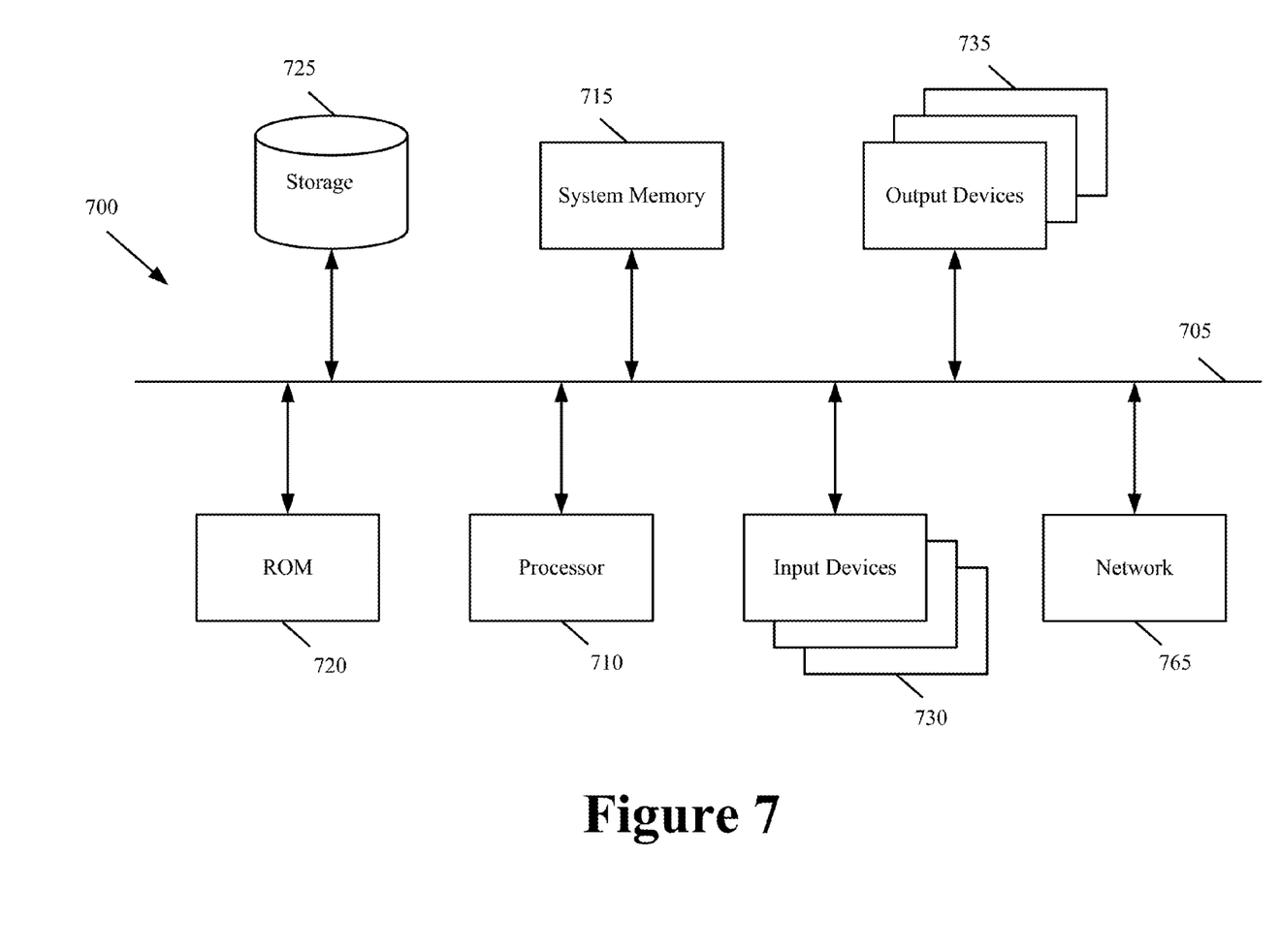
FIG. 7 illustrates a computer system with which some embodiments are implemented.

FIG. 7 illustrates a computer system with which some embodiments are implemented. Such a computer system includes various types of computer-readable mediums and interfaces for various other types of computer-readable mediums that implement the various processes, modules, and engines described above for the credibility management system. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include any of a capacitive touchscreen, resistive touchscreen, any other touchscreen technology, a trackpad that is part of the computing system 700 or attached as a peripheral, a set of touch sensitive buttons or touch sensitive keys that are used to provide inputs to the computing system 700, or any other touch sensing hardware that detects multiple touches and that is coupled to the computing system 700 or is attached as a peripheral. The input device 730 also include alphanumeric keypads (including physical keyboards and touchscreen keyboards), pointing devices (also called "cursor control devices"). The input devices 730 also include audio input devices (e.g., microphones, MIDI musical instruments, etc.). The output devices 735 display images generated by the computer system. The output devices include printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet. For example, the computer 700 may be coupled to a web server (network 765) so that a web browser executing on the computer 700 can interact with the web server as a user interacts with a GUI that operates in the web browser.

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a credibility management system comprising at least one server with a processor and non-transitory computer-readable memory, a computer-implemented method for facilitating real-time management of one's credibility across a plurality of online sites, the computer-implemented method comprising:

computing by operation of the processor, an overall score quantifying credibility of a particular entity based on sentiment that is expressed in a plurality of posts that target the particular entity and that have been previously published across a plurality of online sites by different users;

aggregating from a particular online site of the plurality of online sites to the server, a newly published post expressing sentiment toward the particular entity;

computing by operation of the processor, a first score quantifying an impact that the sentiment expressed in the newly published post has on the overall score for the particular entity;

disseminating the newly published post with the first score from the server via a real-time communication medium to the particular entity;

receiving a response post to the newly published post from the particular entity at the server;

computing by operation of the processor, a second score based on (i) at least one of sentiment and content expressed in the response post and (ii) timeliness of the response post to the newly published post, wherein impact of the second score is increased when the response post is received within a first time interval immediately following a time when the newly published post is disseminated to the particular entity, and wherein impact of the second score is decreased when the response post is received within a second time interval that follows the first time interval;

adjusting by operation of the processor, the overall score based on the first score and the second score; and presenting the adjusted overall score for the particular entity in response to a query for the credibility of the particular entity.

2. The computer-implemented method of claim 1 further comprising publishing the response post with the adjusted overall score for the particular entity.

3. The computer-implemented method of claim 1 further comprising weighting an impact that each post of the plurality of posts has on the overall score based on how recent that post was published to an online site, wherein a first post that is published within a first recent time period is weighted more heavily than a second post that is published within a second distant time period that is after the first recent time period.

4. The computer-implemented method of claim 1 further comprising configuring the real-time communication medium with which to disseminate the newly published post to the particular entity, wherein the real-time communication medium comprises at least one of text message and instant message enabling real-time communication with the particular entity.

5. The computer-implemented method of claim 4, wherein configuring the real-time communication medium further comprises enabling the system to receive the response post from the particular entity using the real-time communication medium.

6. The computer-implemented method of claim 1 further comprising aggregating a reply to the response post.

7. The computer-implemented method of claim 6 further comprising computing a third score based on sentiment expressed in the reply.

8. The computer-implemented method of claim 7 further comprising adjusting the overall score based on the third score.

9. A non-transitory computer-readable storage medium comprising a computer program embodied therein, said computer program configured to cause a computer that executes said computer program to:

compute an overall score quantifying credibility of a particular entity based on sentiment that is expressed in a plurality of posts that target the particular entity and that have been previously published across a plurality of online sites by different users;

aggregate from a particular online site of the plurality of online sites, a newly published post expressing sentiment toward the particular entity;

compute a first score quantifying an impact that the sentiment expressed in the newly published post has on the overall score for the particular entity;

disseminate the newly published post with the first score to the particular entity;

receive a response post to the newly published post from the particular entity;

compute a second score based on (i) at least one of sentiment and content expressed in the response post and (ii) timeliness of the response post to the newly published post, wherein impact of the second score is increased when the response post is received within a first time interval immediately following a time when the newly published post is disseminated to the particular entity, and wherein impact of the second score is decreased when the response post is received within a second time interval that follows the first time interval;

adjust the overall score based on the first score and the second score; and present the adjusted overall score for the particular entity in response to a query for the credibility of the particular entity.

10. The non-transitory computer-readable storage medium of claim 9, wherein the computer program is further configured to cause the computer executing the computer program to publish the response post with the adjusted overall score for the particular entity.

11. The non-transitory computer-readable storage medium of claim 9, wherein the computer program is further configured to cause the computer executing the computer program to weight an impact that each post of the plurality of posts has on the overall score based on how recent that post was published to an online site, wherein a first post that is published within a first recent time period is weighted more heavily than a second post that is published within a second distant time period that is after the first recent time period.

12. The non-transitory computer-readable storage medium of claim 9, wherein the computer program is further configured to cause the computer executing the computer program to configure a real-time communication medium with which to disseminate the newly published post to the particular entity, wherein the real-time communication medium comprises at least one of text message and instant message.

13. The non-transitory computer-readable storage medium of claim 9, wherein the computer program is further configured to cause the computer executing the computer program to aggregate a reply to the response post.

14. The non-transitory computer-readable storage medium of claim 13, wherein the computer program is further configured to cause the computer executing the computer program to compute a third score based on sentiment expressed in the reply.

15. The non-transitory computer-readable storage medium of claim 14, wherein the computer program is further configured to cause the computer executing the computer program to adjust the overall score based on the third score.

* * * * *